United States Patent Office 3,455,883
Patented July 15, 1969

3,455,883
POLYISOCYANATES AND DERIVATIVES
Marwan R. Kamal, Minneapolis, and Edgar R. Rogier, Hopkins, Minn., assignors to General Mills, Inc., a corporation of Delaware
No Drawing. Filed Jan. 9, 1963, Ser. No. 250,211
Int. Cl. C08g 22/28; C07c 19/04
U.S. Cl. 260—77.5                  10 Claims This invention relates to novel polyisocyanates and polymers prepared from such polyisocyanates. More particularly, the present invention relates to new polyisocyanates derived from polymeric fat acids and to polymers prepared from such polyisocyanates and polyfunctional organic compounds containing labile hydrogen atoms.

The polyisocyanates of our invention have the following idealized, structural formula:

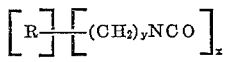

where $y$ is 0 or 1, $x$ is an integer of 2 to about 4 and R is the hydrocarbon group of polymeric fat acids. Preferably, $x$ is 2.

The polyisocyanates wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. This method of preparation can be conveniently illustrated by the following equations (using a dimeric fat acid as an example):

$$3R(COOH)_2 + 2PCl_3 \rightarrow 3R(COCl)_2 + 2H_3PO_3$$

$$R(COCl)_2 + 2NaN_3 \rightarrow R(CON_3)_2 + 2NaCl$$

$$R(CON_3)_2 \xrightarrow{\Delta} R(NCO)_2 + 2N_2$$

The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates. This method of preparation can be conveniently illustrated by the following equations (using a dimeric fat acid as an example):

$$R(COOH)_2 + 2NH_3 \rightarrow R(CN)_2 + 4H_2O$$

$$R(CN)_2 + 4H_2 \xrightarrow[\text{Catalyst}]{NH_3} R(CH_2NH_2)_2$$

$$R(CH_2NH_2)_2 + COCl_2 \xrightarrow{\Delta} R(CH_2NCO)_2 + 2HCl$$

The polymeric fat acids, useful as the starting materials for preparing our polyisocyanates, are prepared by polymerizing a fat acid. The term "fat acid" as used herein refers to naturally occurring and synthetic monobasic aliphatic acids having hydrocarbon chains of 8–24 carbons atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The saturated, ethylenically unsaturated, and acetylenically unsaturated fat acids are generally polymerized by somewhat different techniques, but because of the functional similarity of the polymerization products, they are all generally referred to as "polymeric fat acids."

Saturated fat acids are difficult to polymerize, but polymerization can be obtained at elevated temperatures with a peroxidic reagent such as di-t-butyl peroxide. Because of the low yields of polymeric products, these materials are not commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable agents for the polymerization include acid or alkaline clays, di-t-butyl peroxide, boron trifluoride and other Lewis acids, anthraquinone, sulfur dioxide and the like. Suitable monomers include the branched and straight chain, poly- and monoethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

Acetylenically unsaturated fat acids, such as isanic and isanolic acids, can also be polymerized to give polymeric acids which can be used. The acetylenically unsaturated acids occur only rarely in nature and are expensive to synthesize. Therefore, they are not currently of commercial significance.

Although any one of the above-described saturated, ethylenically unsaturated and acetylenically unsaturated fat acids may be used to prepare the polymeric fat acids, it is generally the practice in the art to polymerize mixtures of acids (or the simple aliphatic alcohol esters— i.e., the methyl esters) derived from the naturally occurring drying and semi-drying oils. Suitable drying and semi-drying oils include soybean, linseed, tall, tung, perilla, oiticia, cottonseed, corn, sunflower, dehydrated castor oil and the like. Also, the most readily available acids are oleic and linoleic and thus they are preferred starting materials for the preparation of the polymeric fat acids. It is preferred to employ as starting materials in the preparation of the polyisocyanates, relatively pure dimerized fat acids. Such acids can be obtained from mixtures containing monomer, the dimerized fat acids, trimerized fat acids and higher polymers by high vacuum distillation or solvent extraction. The use of relatively pure dimerized fat acids as a starting material is advantageous where a diisocyanate is to be prepared for use as a monomer in the preparation of linear high molecular weight polymers. Relatively pure trimerized fat acids can be used where a triisocyanate of high purity is desired. Of course, mixtures of the polymerized fat acids can also be used to prepare mixtures of polyisocyanates. Any of the described unsaturated polymeric fat acids can be hydrogenated prior to the use thereof in the polyisocyanate preparation.

The following examples illustrate the preparation of polyisocyanates of the above-described formula wherein $y$ is 0.

Example A

In a 1 liter, round bottom flask equipped with a reflux condenser protected by a calcium chloride drying tube were placed 200 g. of purified dimerized fat acid dissolved in 200 ml. of Skellysolve B and 65 g. of phosphorus trichloride. The dimerized fat acid was derived from the mixture of acids in tall oil and consisted mainly of dimerized linoleic and oleic acids. It had the following properties: wt. percent dimerized fat acid—99; wt. percent monomer—0.5; Neut. equiv.—286; and Sap. equiv.— 280. The reaction mixture was heated under reflux for 2 hours and then allowed to stand overnight. The clear solution of the dimerized fat acid chloride was decanted from the heavy phosphorus acid. The solvent and excess phosphorus trichloride were removed under reduced pressure.

Into a 1 liter reaction flask equipped with cooling coils, stirrer and thermocouple was placed a solution of 30.4 g. sodium azide in 125 ml. water cooled to 10° C. To this rapidly stirred solution was added a solution of 100 g. of the dimerized fat acid chloride dissolved in 150 ml. of acetone. The reaction temperature was controlled at 10–15° C. during the addition and during a 1 hour period following addition, after which 200 ml. of heptane was added. The heptane layer was separated, washed with 2 portions of cold water, and then dried over magnesium sulfate. To 200 ml. heptane maintained at 65–70° C. was added the above dried heptane solution of the dimerized fat acyl azide. The solution was maintained at a temperature of 65–70° C. for 1 hour and then the heptane was evaporated at reduced pressure. There was obtained 70 g. liquid diisocyanate having the following formula:

OCN—D—NCO where D is the dimeric fat radical derived from the starting dimerized fat acids.

Example B

The preparation as described in Example A was repeated except that the dimerized fat acid chloride (94 g.) was dissolved in 140 ml. of heptane instead of acetone. There was obtained 63 g. of the diisocyanate.

Example C

The preparation as described in Example A was repeated except that 213 g. of the dimerized fat acid chloride was dissolved in 300 ml. acetone. There was obtained 177 g. of the diisocyanate.

Polyisocyanates of the present invention having the above-described general formula wherein $y$ is 1 are prepared by first converting the polymeric fat acids to the corresponding polynitriles. The details of this reaction are set forth in chapter 2 of Fatty Acids and Their Derivatives by A. W. Ralston, John Wiley & Sons, Inc., New York (1948). Polyamines are prepared from the polynitriles by hydrogenating the nitriles in the presence of ammonia and a catalyst such as Raney nickel. Where a diisocyanate is to be prepared, a relatively pure dimerized fat acid can be used as the starting material. Also, the corresponding dimer nitrile or dimer amine can be distilled to provide a dimer amine reactant of high purity. The preparation of these polyisocyanates is illustrated by the following examples:

Example D

Two hundred forty grams of phosgene (2.42 mole) were dissolved in 700 ml. of dry toluene with cooling in an ice bath to maintain the solution temperature below 5° C. The phosgene solution was then placed in a 2 liter, 3-neck flask equipped with a Dry Ice condenser, a stirrer and a funnel. A solution of 164.4 g. double distilled dimer amine (0.6 eq.) in 200 ml. toluene was placed in the funnel. The diamine was prepared by hydrogenating a dimer nitrile in the presence of ammonia and methanol-wet Raney nickel catalyst. The dimer nitrile was prepared from a dimerized fat acid derived from the mixture of acids in tall oil which acid consisted mainly of dimerized linoleic and oleic acids. The dimer amine had the following properties: wt. percent monomer—0.5; wt. percent dimer—98.5; wt. percent trimer—1.0; and Neut. equiv.—271.

The flask was warmed by using a heating mantle until a heavy reflux of phosgene was observed (40–50° C.). The dimer amine solution was then added slowly over a 1 hour period. After the addition was complete, the reaction mixture was refluxed for an additional 2 hours. The Dry Ice condenser was replaced with a water condenser and the temperature of the solution was raised slowly until the toluene began to reflux. The refluxing was continued for 6 hours after which the heating was discontinued and the solution allowed to cool to room temperature. The toluene was then removed under reduced pressure. There was obtained 181.4 g. of diisocyanate having the formula:

OCN—CH$_2$—D—CH$_2$—NCO where D is the dimeric fat radical derived from the starting dimerized fat acid. The diisocyanate was a light brown, oily liquid.

Example E

The procedure of Example D was repeated except that the dimer amine was hydrogenated before the reaction. There was obtained 179 g. of saturated diisocyanate which had substantially the same properties as the diisocyanate of Example D but was lighter in color.

The polyisocyanates of the present invention can be handled with unexpected ease. Thus they are characterized by very low toxicity and have a long shelf life due to their slow reactivity with moisture. They are particularly useful for preparing polymers from polyfunctional organic compounds containing labile hydrogen atoms. We have found that condensation polymers of our polyisocyanates and amines can be prepared without difficulty. The reactions of other isocyanates such as aromatic diisocyanates and amines are extremely difficult to control. Also, the polymers prepared according to our invention have good flexibility and are easily molded. Polyureas and polyurethanes prepared from our polyisocyanates are tough and absorb only extremely low amounts of water.

The polyfunctional organic compounds containing active hydrogen atoms can be selected from a wide variety of materials. These compounds contain groups such as —OH, —NH$_2$, —NRH, —COOH, —SH and the like. Examples of such reactants are diols, polyfunctional phenols, diamino compounds, diacids, dithiols and the like. Compounds containing mixed functional groups can also be used such as hydroxycarboxylic acids, aminoalcohols, aminoacids and the like. Representative polyfunctional organic compounds include: ethylene glycol, diethylene glycol, trimethylene glycol, tetramethylene glycol, hexamethylene glycol, decamethylene glycol, 1,5-pentanediol, 1,4-hexanediol, resorcinol, pyrocatechole, p,p'-dihydroxydiphenyl, pyrogallol, decamethylene dithiol, thioresorcinol, ethylene dithiol, phthalic acid, adipic acid, hexamethylene diamine, trimethylene diamine, 1,3-diaminobutane, tetramethylene diamine, phenylene diamine, toluene diamine, xylylene diamine, ethanolamine, N-phenyldiethanolamine, 2 amino-1-butanol, triethanolamine, 12-hydroxydecanoic acid, piperazine, bis-(hydroxymethyl) durene, 2,4-dinitrophenyl hydrazine, phenyl hydrazine, and the like. Said compounds preferably contain from 2 to about 40 carbon atoms.

The following examples illustrate the preparation of polymers according to the present invention.

Example I

Into a flask fitted with a reflux condenser was charged 0.046 m. piperazine dissolved in 25 ml. distilled m-cresol and then 0.046 m. of the diisocyanate of Example D was added over a 10-minute period. An immediate reaction occurred with heat being evolved. The reaction mixture was heated to reflux temperature and refluxed for 6 hours. It was then cooled and poured over 500 ml. of methanol in a Waring blender. The precipitated gummy material was separated from the methanol and dissolved in methylene chloride. The methylene chloride was evaporated and the residue dried in a vacuum oven at 90° C. The inherent viscosity of the polymer was 0.37 in m-cresol (1% conc., 30° C.—inherent viscosity measured in same way in the examples to follow). A portion of the polymer was molded at 200° F. to yield a flexible material having excellent resistance to tear.

The polymers of the present invention can also be prepared by interfacial polymerization techniques as is shown by the following example.

Example II

Into a Waring Blendor was placed 0.02 m. piperazine in 150 ml. water (room temperature) and a small amount of sodium lauryl sulfate paste. An emulsion was formed by stirring the piperazine, water and sodium lauryl sulfate and then a solution of 0.02 mole of the diisocyanate of Example D in 150 ml. methylene chloride was added thereto. Stirring was continued for 1 hour and then the resulting thick emulsion was poured over 1500 ml. methanol in a large beaker with vigorous agitation. The light colored gummy residue which separated was placed in a drying dish and dried in a vacuum oven. This polymer had an inherent viscosity of 0.027. A portion of the polymer was molded at 110° C. to give a very tough and flexible material which was lighter in color than the material of Example I.

Example III

Example I was repeated except that the saturated diisocyanate of Example E was used instead of the diisocyanate of Example D. A polyurea having an inherent viscosity of 0.31 was obtained. Molding of the polymer at 180° F. produced a material having similar properties to the molded material of Example I. The material was, however, lighter in color.

Example IV

Example I was repeated using 0.02 m. of 2,5-dimethylpiperazine in place of the piperazine. There was obtained a polyurea having an inherent viscosity of 0.19. The polymer was molded at 240° F. to produce a mold which had good flexibility and was resistant to tearing.

Example V

Example I was repeated using 0.02 m. m-xylylene diamine in place of the piperazine. A solid polymer precipitated when the m-cresol solution was diluted with methanol. The polymer had an inherent viscosity of 0.17 and, when molded at 340° F. gave a flexible but somewhat brittle molded sheet.

Example VI

A mixture of 0.075 m. of the diisocyanate of Example D and 0.075 m. trimethylene glycol was heated at 180° C. for 20 minutes. When cooled, a rubbery polymer was obtained which had an inherent viscosity of 0.36.

Example VII

One half of a solution of 0.02 m. of the diisocyanate of Example D in 30 ml. solvent (the solvent used in this example and in the following Example VIII was an 80:20 by volume mixture of chlorobenzene and O-dichlorobenzene) was added rapidly to a mixture of 0.02 m. tetramethylene glycol, 0.7 ml. dibutyl tin dilaurate and 150 ml. of the solvent. The reaction mixture was heated to reflux and then the other half of the diisocyanate solution was added over a 2 hour period after which the mixture was refluxed for an additional 2 hours. After cooling, the reaction mixture was diluted with 750 ml. methanol and the resulting precipitated gummy polymer was separated from the solvent. It was dissolved in methylene chloride which was then evaporated. The residue was dried in a vacuum oven to yield a rubbery polymer having an inherent viscosity of 0.20.

Example VIII

To a suspension of 0.02 m. 1,2-bis-(4-pyridyl)-1,2-ethanediol in 75 ml. solvent was added 0.7 ml. dibutyl tin dilaurate. This mixture was heated to reflux and one half of a solution of 0.02 m. of the diisocyanate of Example D in 25 ml. solvent was added to the mixture with vigorous stirring. The rest of the diisocyanate solution was added over a 2 hour period and the reaction mixture was refluxed for an additional 10 hours. The resulting polymer was precipitated, separated and dried as set forth in Example VII. The polymer had an inherent viscosity of 0.2 and, when molded at 250° F., gave a molded sheet which was somewhat brittle.

Example IX

To a suspension of 0.075 m. bis-(hydroxymethyl)-durene in 250 ml. xylene heated to reflux was rapidly added one half of a solution of 0.075 m. of the diisocyanate of Example D in 150 ml. xylene. The remaining half of the solution was added over a 3 hour period and the reaction mixture was refluxed for an additional hour. The reaction mixture was then cooled and diluted with 1500 ml. methanol. A solid polymer precipitated which had an inherent viscosity of 0.2 and which, when molded at 200–220° F., gave a relatively brittle sheet.

Example X

To a suspension of 0.02 m. p-xylene glycol in 40 ml. xylene was added 0.7 ml. dibutyl tin dilaurate. The mixture was heated to reflux and then a solution of 0.02 m. of the diisocyanate of Example D in 15 ml. xylene was added over a 15 minute period. The reaction mixture, after being refluxed for an additional 5 hours, was cooled and then diluted with 800 ml. methanol. The solid polymer obtained had an inherent viscosity of 0.24.

Example XI

Example X was repeated using the saturated diisocyanate of Example E. The resulting solid polymer had an inherent viscosity of 0.23. The polymer was molded at 200° F. to give a more flexible, less brittle molded sheet that was lighter in color than could be obtained from the polymer of Example X.

Example XII

To 0.02 m. $\alpha,\alpha'$-dimercapto-p-xylene dissolved in 30 ml. xylene was added 0.7 ml. dibutyl tin dilaurate. Then 0.02 m. of the diisocyanate of Example D dissolved in 15 ml. xylene was added and the mixture refluxed for 2 hours. The reaction mixture was cooled and diluted with 800 ml. methanol. The resulting separated and dried solid polymer had an inherent viscosity of 0.31. A portion of the polymer was molded at 270–290° F. to yield a very tough and flexible material.

Example XIII

Example XII was repeated using the saturated diisocyanate of Example E. The resulting solid polymer had an inherent viscosity of 0.19 and, when molded at 240° F., it yielded a material which was lighter in color but which had the same strength and flexibility as the material of Example XII.

Example XIV

To a solution of 0.02 m. of the diisocyanate of Example D in 30 ml. xylene was added 0.02 m. 2,4-dinitrophenyl hydrazine. The reaction mixture was refluxed for 9 hours and then cooled. It was diluted with 800 ml. methanol to produce a gummy precipitate which was then dissolved in methylene chloride. The methylene chloride was evaporated and the polymer dried in a vacuum oven. The polymer had an inherent viscosity of 0.24 and, when molded at 200° F., gave a flexible, tacky material.

Example XV

A solution of 0.02 m. phenyl hydrazine in 75 ml. xylene was added to 0.02 m. of the diisocyanate of Example D dissolved in 35 ml. xylene and 1 ml. dibutyl tin dilaurate. The reaction mixture was refluxed for 8 hours, cooled, and then diluted with 600 ml. methanol. The resulting gummy material was dissolved in methylene chloride. The methylene chloride was evaporated and the residue dried in a vacuum oven. The polymer had an inherent viscosity of 0.13.

Polymers can also be prepared from our polyisocyanates wherein $x$ is greater than two. Such polymers generally have a lower molecular weight (due to crosslinking) than those prepared from the diisocyanates. The latter polymers can be crosslinked by various methods to further increase their melting points and reduce their solubilities. The polymers are useful as molding compounds, adhesives, in the preparation of laminates and the like.

It is to be understood that the invention is not to be limited to the exact details of operation or the exact compositions shown and described, as obvious modifications and equivalents will be apparent to those skilled in the art and the invention is to be limited only by the scope of the appended claims.

The embodiments of the invention in which an exclusive property or privilege is claimed are defined as follows:

1. A compound having the formula:

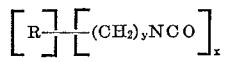

where $y$ is an integer selected from 0 and 1, $x$ is an integer of 2 to about 4, and R is the hydrocarbon group of polymeric fat acids $R(COOH)_x$, said polymeric fat acids having been prepared by polymerizing fat acids of 8–24 carbon atoms.

2. The compound of claim 1 where $y$ is 0.
3. The compound of claim 1 where $y$ is 1.
4. A compound having the formula:

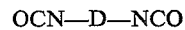

OCN—D—NCO where D is the divalent hydrocarbon group of dimeric fat acids $D(COOH)_2$, said dimeric fat acids having been prepared by polymerizing fat acids of 8–24 carbon atoms.

5. A compound having the formula:

OCN—H$_2$C—D—CH$_2$—NCO where D is the divalent hydrocarbon group of dimeric fat acids $D(COOH)_2$, said dimeric fat acids having been prepared by polymerizing fat acids of 8–24 carbon atoms.

6. A polymer prepared by reacting the compound of claim 1 with a polyfunctional organic compound containing labile hydrogen atoms.

7. A polymer prepared by reacting (A) a compound having the formula:

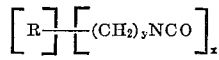

where $y$ is an integer selected from 0 and 1, $x$ is an integer of 2 to about 4, and R is the hydrocarbon group of polymeric fat acids $R(COOH)_x$, said polymeric fat acids having been prepared by polymerizing fat acids of 8–24 carbon atoms, with (B) a difunctional, monomeric, organic compound containing labile hydrogen atoms, said difunctional, monomeric, organic compound being selected from the group consisting of compounds having, as groups supplying the labile hydrogen atoms, (1) only hydroxyl groups, (2) only amine groups, (3) only mercapto groups, (4) only carboxyl groups, (5) one amine group and one hydroxyl group and (6) one hydroxyl group and one carboxyl group.

8. The polymer of claim 7 wherein $x$ is 2 and the difunctional, monomeric, organic compound contains from 2 to about 40 carbon atoms.

9. The polymer of claim 7 wherein the difunctional, monomeric, organic compound is piperazine.

10. The polymer of claim 7 wherein the difunctional, monomeric, organic compound is meta-xylylene diamine.

References Cited

UNITED STATES PATENTS

| | | | |
|---|---|---|---|
| 2,303,363 | 12/1942 | Kaase et al. | 260—453 |
| 2,929,800 | 3/1960 | Hill | 260—77.5 |
| 3,012,991 | 12/1961 | Schultheis et al. | 260—77.5 |
| 3,054,757 | 9/1962 | Britain | 260—77.5 |
| 3,004,945 | 10/1961 | Farago | 260—77.5 |

OTHER REFERENCES

Siefkin, Liebig's Annalen der Chemie, vol. 562, 1949.

HOSEA E. TAYLOR, JR., Primary Examiner

M. J. WELSH, Assistant Examiner

U.S. Cl. X.R.

260—407, 453

PO-1050
(5/69)

UNITED STATES PATENT OFFICE
CERTIFICATE OF CORRECTION

Patent No. 3,455,883          Dated July 15, 1969

Inventor(s) Marwan R. Kamal, Edgar R. Rogier

It is certified that error appears in the above-identified patent and that said Letters Patent are hereby corrected as shown below:

Column 5, line 20, "0.027" should read -- 0.27 --. Column 6, line 7, "0.2" should read -- 0.22 --.

SIGNED AND
SEALED

OCT 21 1969

[SEAL]
Attest:

Edward M. Fletcher, Jr.
Attesting Officer

WILLIAM E. SCHUYLER, JR.
Commissioner of Patents